United States Patent [19]

Liu

[11] Patent Number: 4,987,975
[45] Date of Patent: Jan. 29, 1991

[54] PORTABLE AUTOMOBILE GREASE SUCTION MACHINE

[76] Inventor: Chen C. Liu, No.9, Lane 119, Section 3, Ho Ping East Road, Taipei, Taiwan

[21] Appl. No.: 509,745

[22] Filed: Apr. 17, 1990

[51] Int. Cl.$^5$ .............................................. F01M 11/04
[52] U.S. Cl. .................. 184/105.1; 417/411; 417/423.14
[58] Field of Search ............... 184/1.5, 6.28, 105.1; 417/410, 411, 372, 423.14

[56] References Cited

U.S. PATENT DOCUMENTS

| | | | |
|---|---|---|---|
| 2,635,550 | 4/1953 | Granberg | 417/410 |
| 3,059,583 | 10/1962 | Huber | 417/410 |
| 3,837,767 | 9/1974 | Aller | 417/423.14 |
| 4,770,613 | 9/1988 | Hoover et al. | 417/411 |

Primary Examiner—Ira S. Lazarus
Assistant Examiner—Alan B. Cariaso
Attorney, Agent, or Firm—Bacon & Thomas

[57] ABSTRACT

This invention relates to an automobile grease suction machine, particularly denoting a portable automobile grease suction machine assembled by a sealed type of motor which uses the motor car's own battery as its power source, a sealed type of gear pump box, a rotating shaft connecting link, a suction joint, a suction tube and a lubricant discharger. The presentation of a structure of a simplified vacuum oil suction machine featured for a diminished volume, convenient for application and conveyance and being free from the limitation of the place and time of application are regarded as its objects.

1 Claim, 4 Drawing Sheets

PORTABLE AUTOMOBILE GREASE SUCTION MACHINE

BACKGROUND OF THE INVENTION

This invention relates to an automobile grease suction machine. In other words, this invention particularly denotes a portable oil suction machine which makes use of the suction principle of a gear unit instead of using the principle of vacuum suction.

The function of the lubricant is to form an oil film on the plane of friction, so as to reduce the force of friction, wearing or the possibility of getting burnt. At the same time, it cools down the plane of friction, prevent corrosion from happening, and gets rid of the powder chips which are being produced at the time of operation. That is the reason why after a lubricant has been used for a specific period, it has to be discharged and changed for new. This is a kind of work most common to the automobile repair workshops. When a motor car has been driven for a fixed mileage, the lubricants inside its engine, gear shift housing and the gear housing will have to be discharged and changed for new, so as achieve the expected effect of the lubricant. For this reason the technique of discharging the grease in the engine, gear shift housing and the gear housing adopted by the most advanced automobile workshops are of an auto vacuum type of grease suction machine. In the said auto vacuum type of grease suction machine the principle of vacuum pressure is adopted to suck the grease through the suction pipe into the vacuum pipe, and the lubricant will then be discharged through the discharge pipe. Owing to the vacuum suction principle which is adopted and the high adhesion capability of the grease, its volume and the force of suction will be in the direct ratio. Generally speaking, the larger is the force of vacuum suction, the larger will its volume be expanded. Because of this reason, most of the automobile grease suction machines being used in automobile workshops are commonly found to be of such floor-fixing models. As shown in FIG. 1, the huge volume of the lubricant suction machine can only be smoothly moved around by means of foot wheels. In addition, the alternation current (i.e. power for domestic purpose) makes it more inconvenient for its utilization. Therefore, this not only limits the time and place of its application, but also cause inconvenience when it is being carried outdoor.

In view of these defects, the inventor made up his mind to start conducting a continuous study and research, and he managed to successfully develop and present this invention.

A BRIEF DESCRIPTION OF THE INVENTION

The object of this invention is to provide a portable automobile grease suction machine for convenient utilization.

Another object of this invention is to provide a portable automobile grease suction machine which used the battery of the motor car itself as its own power source, and is remarkable for its outdoor portability without suffering from any limitation on the time and time of its utilization.

Still another object of this invention is to provide a portable automobile grease suction machine which makes use of the surface of the gear pump to form an oil film and the powerful force of suction produced by high revolutions and because of the short length found in the oil pipe being used to achieve a highly efficient oil suction effect.

Relating to the technique, measures and effects adopted for the purpose of achieving the forementioned objects of this invention, a more preferred embodiments coping with related drawings are introduced in the detailed description set below for the better understanding of the readers.

REFERENCING TO RELATED DRAWINGS

DETAILED DESCRIPTION OF THE INVENTION

Figure 1:
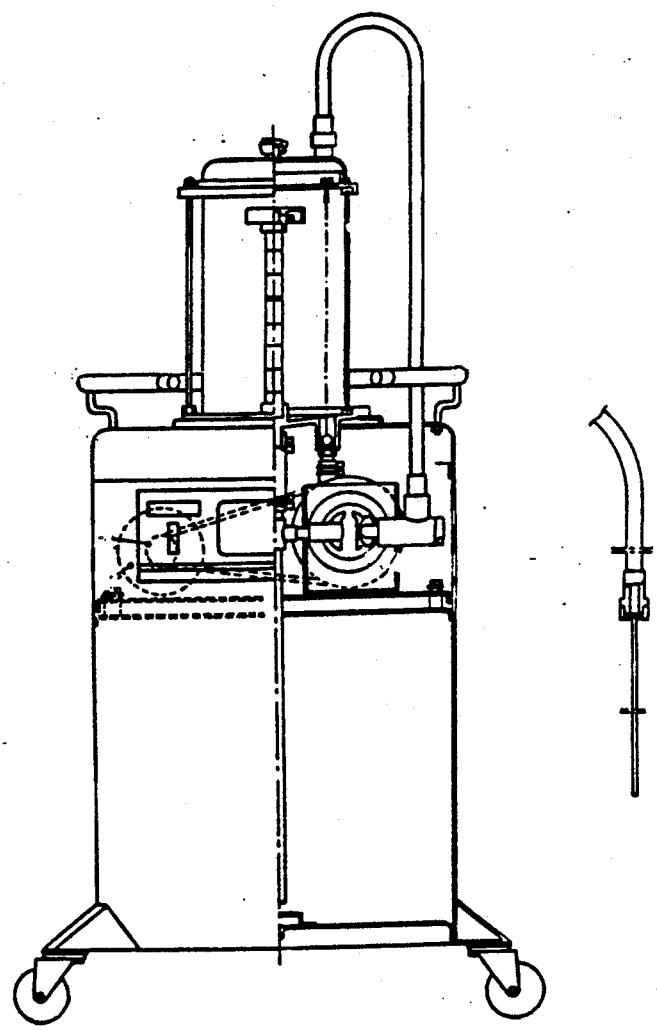
FIG. 1 is the structural view of a conventional automobile grease vacuum suction machine.
Figure 2:
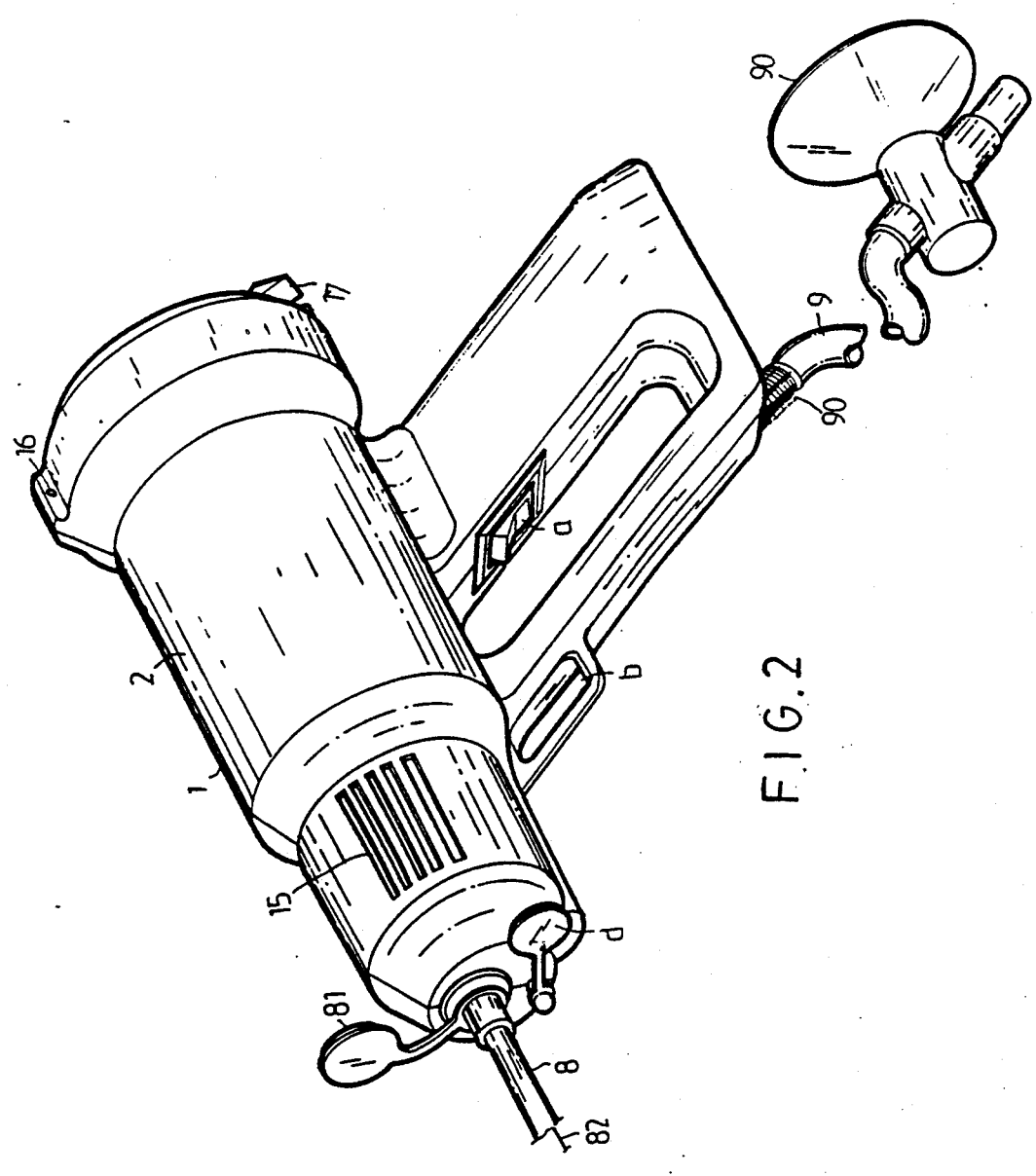
FIG. 2 is a solid view of the outer appearance of this invention.
Figure 3:
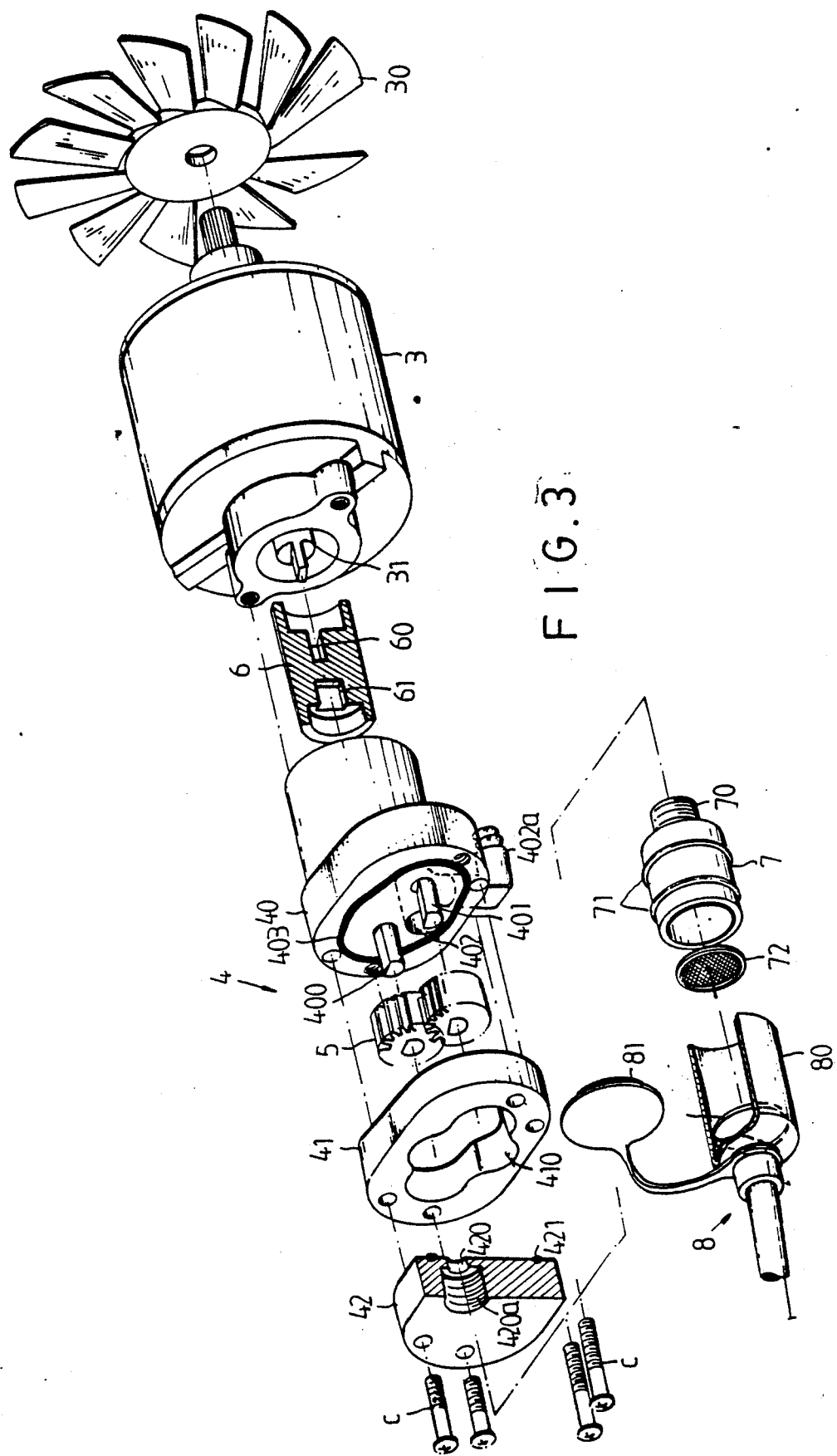
FIG. 3 is a solid segmentation view of the internal structure of this invention.
Figure 4:
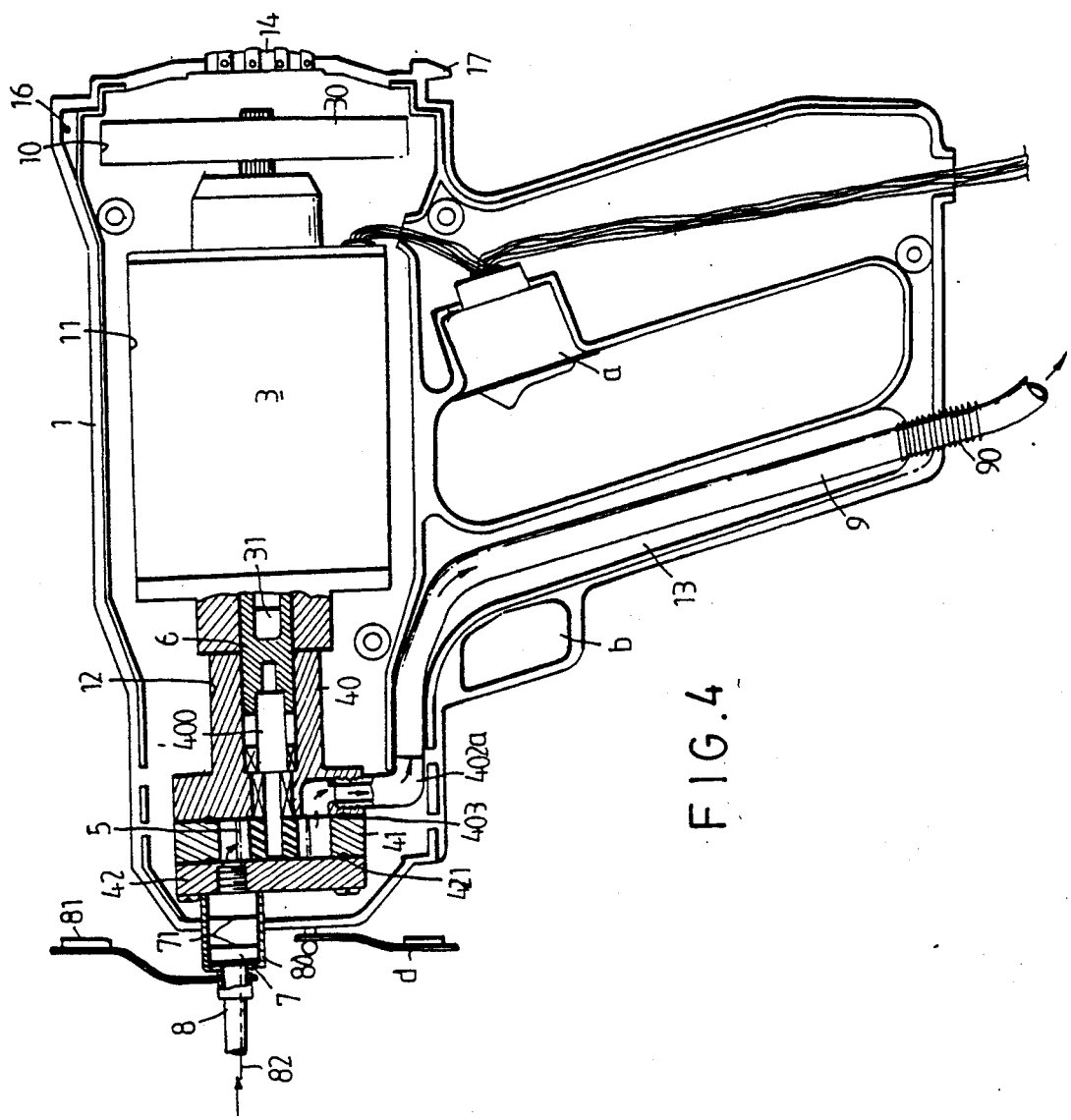
FIG. 4 is a sectional view of the structure of this invention.

Please refer to FIGS. 2, 3, and 4. These indicated the outer main body view, the internal structure solid segmentation view and the overall assembly sectional view of the invention. From FIG. 2 it can be seen that the outer appearance of this invention is roughly similar to that of a portable air dryer, comprising mainly of an upper and a lower shell body 1 and 2, a motor 3, an gear pump case 4, a gear unit 5, a gear shift connecting link 6, a suction pipe joint 7, a suction pipe 8 and a grease discharge pipe 9, wherein the upper and lower shell body 1 and 2 are roughly similar to the shape of a portable air dryer and are inter-corresponding to each other. According to its requirement, such fittings as a blade accomodation chamber 10, a motor accomodation chamber 11, a gear pump case accomodation chamber 12, a grease discharge guiding groove 13, a motor radiator hole 14, a gear pump radiator hole 15 are set separately in its interior. A switch a. is set near the edge of the handle grip and a hanging hole b. is set near the front end of its handle. Also separately set on the upper and the lower end of the motor radiator hole are an attachment connecting hole 16, and inverted hanging convexed block 17. The motor 3 is a cylindrical body, having a gear shift fixed bland 30 set at one of its end and an output shaft end section 31 in the shape of a straight-lined stroke set at the other end. The gear pump case 4 is assembled by three sections, namely, the front, the middle and the rear gear pump cases 40, 41, 42, in which the gront gear pump case is designed to connect the motor output shaft and the gear unit. The section of the motor output shaft 31 it connected is a tube-shaped body which is protruded out of the main body. In the interior of the forementioned protrusive tube the bearing is being used for the setting of a main drive shaft 400 of which the front end is made in the shape of a straight-lined stroke. In the interior of the body itself a driven shaft 401 is also set by making use of the bearing. In the space lying in between its main drive shaft 400 and the driven shaft 401 a grease discharge hole 402 (in an L shape) which inserts half of the depth into the interior and extend toward the bottom plane for connection is set at the plane of its rear end. The forementioned grease discharge hole 402 is connected with a pipe sleeve joint 402a by screws. Moreover, an anti-leakage seal ring 403 which is having half of its body protruded is set at the outer periphery of the forementioned main drive shaft 400 and the driven shaft 401. The middle gear pump case 41 is made in the shape of a chip similar in dimension to that of the oval shaped front gear pump case; while in the middle a cross-shaped hole 410 is set for the accomodation of the gear unit 5, the grease suction hole and the grease discharge hole; and the rear gear pump case 42 is similar in shape and dimension to those of the middle gear pump case, except that a ladder-shaped grease suction hole 420 is set at the spot where it connects with the grease suction hole. Threads 420a are set on the large boring of the forementioned ladder-shaped grease suction hole 420 to enable the connecting of the suction pipe joint with screws. Moreover, a half protruded anti-leakage sealed ring should also be set on a position which is corresponding to the front end plane of the rear gear pump case 42 and the anti-leakage sealed ring 403 located on the front gear pump case. By means of a multiple of fixing screws c. the front, middle and rear gear pump cases are firmly locked to integrally form the gear pump case 4 of this invention, while the gear unit 5 which comprised of two units of gears is precisely set in the cross-shaped hole 410 of the middle gear pump case 41 and further pivotly set on the main drive shaft 400 and the driven shaft 401. The gear shift connecting link 6 is designed to meet the requirement for the high precision connection of the motor output rotating shaft 31 and the main drive shaft 400 inside the gear pump case. Its outer appearance is in a cylindrical shape, and in its interior two straight-lined stroke grooves 60, 61 which are perpendicular with each other are separately set, so as to separately and pivotly connect with the motor output shaft 31 and the main drive rotating shaft 400 of the gear pump case. As indicated in FIG. 4, the grease suction pipe joint 7 is assembled by a multiple of circular tubes which varies in their hole diameter. On the small tube thread 70 is set which can be connected with the thread 420a of the ladder-shaped grease suction hole on the rear gear pump case. On the large pipe two semi-protruded anti-leakage sealed ring 71 are set. In the interior of the mouth of the pipe a filtering net which is having a pulling handle in its central position is set by having the threads on its small tube screwed onto the ladder-shaped oil hole 420 on the rear gear pump case. On the front end of the grease suction pipe 8 is a sleeve joint 80 the internal hole of which matched with the bore diameter of the grease suction pipe joint 7. On the forementioned sleeve joint 80 is a grease stopping plug 81. Also set in the interior of the pipe is a steel wire net 82. By means of the extreme end of said steel wire net 82 a circular ring is made and stuck inside the sleeve joint 80, so as to prevent the pipe from being bent, as well as prevent if from falling off. The grease discharge pipe 9 is set in the grease discharge pipe guiding groove 13 which are inside the upper and the lower shell body 1.2. and is connected with the pipe sleeve joint 402a. At the end of the exit of its upper and lower shell body 1. 2. a bending supplementary member 90 is also sleeved. At the spot near the outlet a sucking disk 91 is set to facilitate fixing the end of the outlet of the grease discharge pipe.

As for the assembling technique of this invention, please refer to FIG. 4. As indicated the gear unit 5 is first assembled on the main drive shaft 400 and the driven shaft 401. Then lock the front, middle and the rear gear pump cases 40. 41. 42 firmly together into an integral body. Connect the motor output shaft 31 with the main drive shaft 400 which is located in the interior of the gear pump case. Then lock the suction pipe together with its joint firmly to the ladder-shaped suction connecting hole 420 which is located on the rear gear pump case. After having completed the assembly, place the integral body according to the shape and characteristics of each of its components into the supporting groove prefixed in the upper aand the lower shell 1. 2. Then sleeve the grease discharge pipe 9 into the grease discharge joint 402a, and draw it out through the grease discharge guiding groove 13. Lastly, cover the upper and the lower sheel body 1. 2. and thus completed the assembly work. Its outer appearance is similar to what is indicated in FIG. 2.

The forementioned mechanism presented by this invention is having the following advantages and effects:

1. The design of the compactly sealed type of motor and gear pump case 4 of the said automobile grease suction machine which copes with a rotating shaft connecting link 6, a motor rotating shaft, a low tolerance graded gear pump case 4 and a grease suction pipe which has been shortened is found to be simple in its structure, small in size and powerful in its suction force. Moreover, the tolerance in the assembly of the forementioned gear unit 5 and the gear pump case is so low that, when the grease is being sucked in, a layer of oil film will be formed on the surface of the forementioned gear unit, so as to achieve a perfect compactness, to the ultimate effect of upgrading its force of suction. Furthermore, it can also be applied to suck such fuels as gasoline without causing any danger. Because the overall structure of the motor is of a compact type of design, the air which is being sucked in by the blade 30 will be blown from the periphery of the motor toward the direction of the gear pump case that makes it impossible to be blown to the interior of the motor. This explains why although it is mainly used for sucking of grease, it can still be used to suck such inflammable articles as the gasoline without causing any danger.

2. The grease suction pipe of the forementioned automobile grease suction machine is having the setting of a sleeve joint 80 which can be installed or dismantled on its front end to match with its joint 7. When it is not in use, it can be dismantled and placed inside the body of the grease suction machine. There is also the availability of a leakage prevention plug 81d which is separately set on the pipe and the shell body. The said leakage prevention plug 81d is used to separately plug against the end mouth of the pipe and the end mouth of the joint 7, so as to prevent the grease in the opening of the pipe and the joint from flowing out and cause pollution to the environment. Therefore, it achieves the effect of keeping the environment ot be free from pollution.

3. In the forementioned automobile grease suction machine it is so designed that the battery of the motor car is used as the power source for its motor 3. Therefore, there is no limitation for the place and time of its utilization. In other words, as long as a battery is available in the motor car, this grease suciton mechanism can be used at any time and place without any limitation. In addition, it can also achieve the effect of keeping the environment ot be free from pollution.

Summarizing the above-mentioned descriptions, it can be seen that the automobile grease suction machine disclosed by the preferred embodiments of this invention is indeed practical and effective. It is not only found to be simple in its structure, light in weight, easy in its portability, but its suction force is also found to be twice as powerful as that which is found in a conventional one. Furthermore, leakage prevention fittings are set on the pipes to plug against the interior of the pipe when the mechanism is not in use, so as to prevent the grease from leaking out and thus achieve the effect of keeping the environment clean. On the other hand, its motor makes use of the motor car's own battery as its power source. This sets the machine free from the limitation of the place and time of its utilization as is commonly found in a conventional automobile grease suction machine.

What is claimed:

1. A portable automobile grease suction machine, which comprises:

an upper and a lower shell, the two of which are of a symmetrical shape which is roughly similar to that of a portable air dryer and having set in its interior a blade accomodation chamber, a motor accomodation chamber, a gear pump case accomodation chamber, a grease discharge guiding groove, a motor radiator hole, a gear pump case radiator hole, a starting switch at a spot close to the edge of the handle grip, a hanging hole on the front edge of the handle and, at the same time, the separate setting of an attachment connecting hole and an inverted hanging convexed block;

a motor, which is of a compact type of cylindrical body, with a rotating shaft at one of its end fixed with a blade of an output shaft and the other end being in a shape of a straight-lined stroke;

a gear pump case assembled by a front, a middle and a rear gear pump cases, in which the front gear pump case is to connect with the output shaft and a gear unit; a part of the output shaft is in a shape of a protruded cylindrical body, having set in its interior a main drive shaft of which a front end plane is in a shape of a straight-lined stroke, and a driven shaft is set on its rear end plane; an L shaped grease discharge hole is set at a space in between the main and driven shafts; a semi-protruded anti-leakage sealed ring is set at the outer periphery of the main drive shaft and the driven shaft; and the middle gear pump case being in a shape of a chip which is similar in dimension to that of an oval shaped of the front gear pump case, having set in the middle gear pump case a jointly formed cross-shaped hole to accomodate the gear unit, a grease suction hole and the L-shaped grease discharge hole; on the other hand, the rear gear pump case is similar in its outer appearance and size to those of the middle gear pump; and a ladder-shaped grease suction hole is set at a place where it connects with the grease suction hole; in an interior of a large bore path of said ladder-shaped grease suction hole threads are set; also set on a position which corresponds to the semi-protruded anti-leakage sealed ring on the front gear pump case is a gear case which is assembled by the semi-protruded anti-leakage sealed ring, the front, the middle and the rear gear pump cases, which makes use of a gear shift connecting link to connect itself with the output shaft of the motor;

the gear shift connecting link is designed to meet with the requirement for the high precision connection of the output shaft with the main drive shaft in the gear pump case; the gear shift connecting link is made in the shape of a cylindrical body, having two inter-perpendicular straight-lined strokes separately set in two end openings;

a grease suction pipe joint assembled by circular pipes of various diameters, having two semiprotruded anti-leakage sealed rings set on a large pipe and is also having the setting in the interior of the opening of the large pipe a filtering net which has a pulling handle in a central position, which is to be connected by screws with the ladder-shaped grease suction hole on the rear gear pump case by means of threads on a small pipe;

a grease suction pipe, which is a sleeve joint the front end of which can be sleeved with the forementioned joint, having an end in the interior of its pipe rolled into a ring-shaped wire net and squeezed against the interior of the sleeve joint, so as to prevent the suction pipe from falling off and also to prevent it from bending; and a grease discharge pipe which is a pipe used to connect with the sleeve joint of the discharge, having a bending supplementary member sleeved to the outlet and of the upper and the lower shell body, having also a sucking disk set at its extreme end.

* * * * *